United States Patent
Dancho et al.

(10) Patent No.: US 11,620,234 B2
(45) Date of Patent: Apr. 4, 2023

(54) OPERATION-DETERMINISTIC WRITE OPERATIONS FOR DATA RECOVERY AND INTEGRITY CHECKS

(71) Applicant: WESTERN DIGITAL TECHNOLOGIES, INC., San Jose, CA (US)

(72) Inventors: Mark J. Dancho, Chandler, AZ (US); Robert Ellis, Phoenix, AZ (US); Kevin O'Toole, Chandler, AZ (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 9 days.

(21) Appl. No.: 16/916,019

(22) Filed: Jun. 29, 2020

(65) Prior Publication Data

US 2021/0406193 A1 Dec. 30, 2021

(51) Int. Cl.
*G06F 12/1009* (2016.01)
(52) U.S. Cl.
CPC .......... *G06F 12/1009* (2013.01); *G06F 2212/1032* (2013.01)
(58) Field of Classification Search
CPC .......... G06F 12/1009; G06F 2212/1032
See application file for complete search history.

(56) References Cited

U.S. PATENT DOCUMENTS

| | | | |
|---|---|---|---|
| 7,818,610 B2 | 10/2010 | Rogers et al. | |
| 8,397,101 B2 | 3/2013 | Goss et al. | |
| 8,949,517 B2 | 2/2015 | Cohen et al. | |
| 9,037,820 B2 | 5/2015 | Ratn et al. | |
| 9,448,919 B1* | 9/2016 | Boyle | G06F 3/0652 |
| 9,477,590 B2 | 10/2016 | Post et al. | |
| 2014/0310494 A1* | 10/2014 | Higgins | G06F 12/0246 711/167 |
| 2016/0147651 A1* | 5/2016 | Desai | G06F 11/1004 711/103 |
| 2018/0232176 A1 | 8/2018 | Dreyer et al. | |
| 2019/0369892 A1* | 12/2019 | Huang | G06F 3/0679 |

\* cited by examiner

*Primary Examiner* — Gary W. Cygiel
(74) *Attorney, Agent, or Firm* — ArentFox Schiff LLP

(57) ABSTRACT

Aspects of a storage device including a memory and a controller are provided that allow for storage of tags identifying data types and sequence numbers with data to facilitate data recovery and system integrity checks following a power failure or other system failure event. The controller is configured during a write operation to include a tag in the data identifying the data type as a host write, a recycle write, or another internal write. Following a system failure event, the controller is configured to read the tags to identify the data type in the write. Based on the tags, the controller is configured to properly rebuild or update a logical-to-physical (L2P) table of the storage device to assign correct logical addresses to the most recent data during data recovery, as well as to verify correct logical addresses during system integrity checks.

20 Claims, 7 Drawing Sheets

400

| | 402 | 404 | 406 |
|---|---|---|---|
| 0 → Codeword 0 | $FTI_0$ | $SN_0$ | Host Data |
| 1 → Codeword 1 | $FTI_1$ | $SN_1$ | Recycled Host Data |
| 2 → Codeword 2 | $FTI_0$ | $SN_2$ | Host Data |
| 3 → Codeword 3 | $FTI_0$ | $SN_3$ | Host Data |
| 4 → Codeword 4 | $FTI_0$ | $SN_4$ | Host Data |

OPERATION-DETERMINISTIC WRITE OPERATIONS FOR DATA RECOVERY AND INTEGRITY CHECKS

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A controller in a flash storage device may implement write operations using different types of data. These data types include, for example, data received from the host for performing host writes, recycled internal data written in garbage collection (GC) operations, and other types of internal data used in writing to the memory, such as event and error logs.

When performing these different write operations, the controller may often write the same data to multiple physical NAND pages across the storage device. These redundant data entries can result from multiple overwrites and recycle operations, for example. This redundant data can prove problematic in cases where a system failure event, such as a power failure, occurs before a logical-to-physical (L2P) mapping table has been updated or a current version of the table has been moved to the non-volatile memory. In this event, the controller may be unable to easily distinguish the multiple data entries during system recovery to identify the most recent data. Such system failures can result in time-consuming procedures that attempt to reconstruct the lost data based on multiple sequence numbers (SNs), or in the loss of the encrypted data altogether.

SUMMARY

One aspect of a storage device is disclosed herein. The storage device includes a memory comprising a memory location. The storage device also includes a controller. The controller is configured to write data to the memory location with a tag identifying the data as a host write or a recycle write.

Another aspect of a storage device is disclosed herein. The storage device includes a memory. The memory includes a first block having a first page. The memory includes a second block having a second page. The storage device further includes a controller. The controller is configured to write data to the first page with a tag identifying the data as a host write. The controller is further configured to write the data to the second page with a tag identifying the data as a recycle write.

A further aspect of a storage device is disclosed herein. The storage device includes a memory having first and second memory locations. The storage device also includes a controller. The controller is configured to write data from a host device to the first memory location with a tag identifying the data as a host write. The controller is further configured to write the data from the first memory location to the second memory location with a tag identifying the data as a recycle write.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
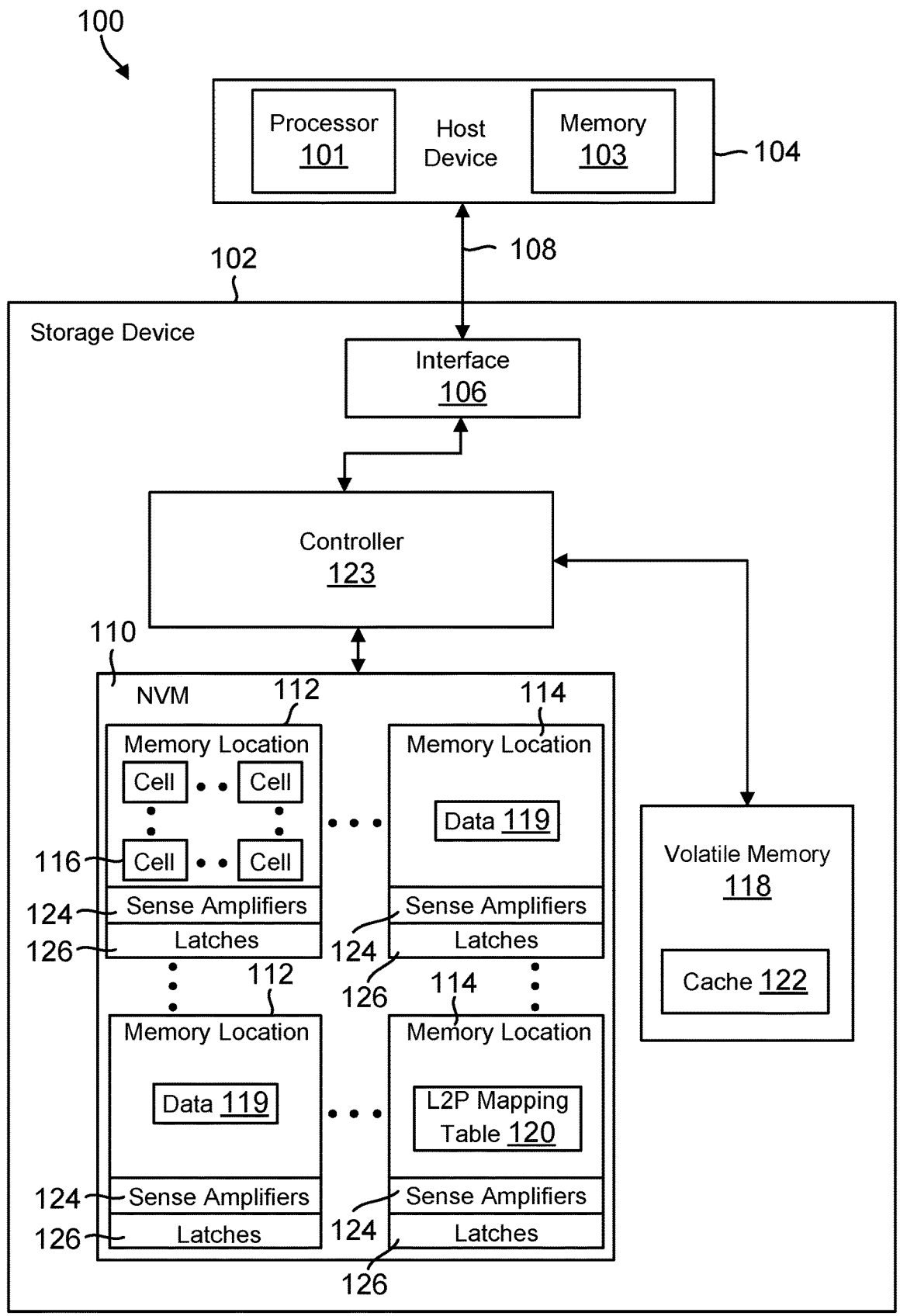
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" and like terminology are used herein to mean serving as an example, instance, or illustration. Any exemplary embodiment described herein as "exemplary" or with descriptive words such as "example" and the like is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

These various aspects of the storage device may be applied to single-threaded devices in which reads, programs (writes) and erases are each performed as part of a serial stream of tasks. Alternatively, these various aspects may be applied with equal force to multi-threaded storage devices in which one or more controllers, together with the circuitry of the storage device, may be handling a plurality of parallel tasks corresponding to different threads of execution at any given time. A multi-threaded environment may involve the one or more controllers and a larger number of memory blocks aggregated together than for the case of a single-threaded environment, with different memory operations concurrently operating on a plurality of blocks or pages within the memory. Thus, for example, the controller may be performing reads and writes to different pages of the memory in parallel. Further, the controller(s) may be executing writes for data received from the host while concurrently initiating GC procedures and other operations, the latter categories typically being performed internally within the storage device and not involving the host.

These storage devices generally write different types of data to the non-volatile memory. For example, in a host write, a controller of the storage device may receive an instruction from a host device (also referred to herein as a "host") to write host data to a memory location specified by a logical block address (LBA) received from the host. During execution of the host write, the controller may send an instruction or command to the NAND (e.g. to one or more dies including the non-volatile memory) to perform a NAND write, during which the data may be programmed into cells of the die(s).

Separately from host writes, the controller may execute parallel instructions to initiate an internal garbage collection (GC) procedure in the non-volatile memory (e.g. including a NAND write). In a GC procedure, the storage device may execute "recycle writes" of data copied from old memory locations to new memory locations specified by the controller. The recycle writes can allow the specified data to be recycled from locations in older memory blocks with mostly stale data entries to new memory locations in a different memory block. GC procedures can also be used to recycle data entries that have been stored in the same memory locations for a longer than usual period of time, which entries may be degrading as a result. In short, GC operations may be used to copy valid data out of blocks otherwise populated with mostly stale data, or to copy data stored in the same location for some specified maximum time to new memory locations. The GC operation can be used to facilitate a subsequent erase operation of the old memory block to make way for storing new data. It will be appreciated that these operations are exemplary in nature, and the details of these operations may differ depending on the type of memory technology and other factors without affecting the principles of the present disclosure.

The storage devices may also perform other write operations involving other types of data that may be internal to the storage device, such as error logs, event logs, and similar operations for keeping track of events internal to the storage device.

To facilitate wear-leveling procedures, and to preserve data integrity, reliability or security, the data may also be scrambled and encoded prior to being written.

Conventionally, a sequence number (SN) may be included in one or more types of write operations to enable the controller to keep track of the order of write operations, and therefore to identify which operations occurred in which order for accurately building and/or updating the L2P mapping table. In the exemplary case of NAND flash technology, the SN may in some embodiments be automatically incremented by the controller during each host write. Conversely, in other embodiments, the SN may be incremented in the NAND (e.g. by a processor or other circuitry in a die) during each NAND write. In still other embodiments, the SN may be incremented using a different technique. For example, in another embodiment, the SN may be auto-incremented by a value that is dependent on a value of the logical block address corresponding to the write operation being performed. Still other configurations are possible.

In many instances, difficulties may be encountered in building or updating the L2P table in a manner that correctly identifies the most recent data and memory location. As an example, host data is commonly recycled, and the SN incremented during the initial host write may be present in the recycled data. For instance, when the controller performs a recycle operation for data including an old SN, if the SN is auto-incremented in the NAND prior to the recycle operation, another SN may be appended to the data with the old SN. As a result, following a recycle operation, multiple SNs may be present in a data word, and/or multiple copies of the same SN may be present in different data entries or memory locations. The SN may consequently not be useful, without more, to identify the most recent data.

An example of this problem may arise when a host write is followed by a recycle operation. That is, at a first time period, a host write may occur in which the current SN is auto-incremented (e.g., by adding "1" to an existing SN value maintained in a register, for example) and added to the data. The controller may then write the data entry with the incremented SN to a first memory location. Subsequently, at a second time period during a GC procedure, a recycle write may occur in which the controller includes another SN with the data copied from the first memory location before the data is written to a second memory location. This sequence of operations may result in the same underlying data having duplicate SN entries at two memory locations, wherein one of the two data entries includes multiple SNs.

Accordingly, while the SN may be useful for identifying the order of writes, the above example illustrates one scenario in which multiple copies of the SN may be included in different data entries in memory, rendering it potentially much more difficult and time consuming for the storage device to sort through the multiple data entries to attempt to identify the proper order of write operations, e.g., following a power or system failure or during a system integrity check.

While this problem may be present in single-threaded memory systems, the problem can be exacerbated in a multi-threaded storage device implementation, where the execution of parallel write operations involving different types of data can result in a race condition involving two or more writes. In a race condition resulting from a plurality of parallel write operations, the write operations may unpredictably occur in different orders prior to a system failure. Because the SNs include no information about the type of data in the write but rather only identify the order of writes, it may not be possible to determine following a system failure event whether the most recent write operation includes valid data, and to what physical location in memory the LBA of the data should be properly assigned.

The problem may also be applicable to data overwrites that occur, for instance, in cases where the memory is NAND flash memory. For example, a failure event such as a power failure or a software-related incident may prevent the storage device from properly performing L2P consolidation (e.g. updating an L2P table in volatile memory before table entries are flushed from the volatile memory to a current L2P table in the non-volatile memory). In these events, the controller may be tasked with rebuilding the current L2P table based on the SNs, and possibly other metadata. Because the controller may not be able to conventionally differentiate the data types when it rereads the SNs during a system recovery event, the controller may erroneously identify internal or recycled data as the most recent data when in fact a valid host write was superseded by an internal write due to a race condition that occurred prior to power failure.

For example, if the controller executes a first host write operation for data, and then receives a command from the host to overwrite the data with other host data at the same LBA, the controller may be required to write the other host data to a new memory location in a different NAND block and update the L2P table to point the LBA to that new memory location. In this example, two copies of data corresponding to the same LBA are present in the NAND device, with one copy being current and the other obsolete.

While the LBA as described herein is used for ease of reference, it will be appreciated that in various embodiments (such as described below), the logical address used by the controller may instead include an internally manipulated index. The index may be an intermediate entry used in the L2P table to specify a physical location in memory. In various embodiments, the index may be obtained from an LBA from the host based on one or more mathematical transformations or logical operations. One example of such an index is a forward table index (FTI), which may be translated from a logical address and used in the L2P table to identify a physical address.

During a conventional system recovery event following a power failure, the controller may generally review the forward table index (FTI) (which may be used to specify the LBA) together with the SNs to rebuild the L2P table. However, with continued reference to the above example of the overwrite, if the controller had initiated a GC operation for data in the old memory location prior to receiving the overwrite instruction, but the recycle write happens to occur after the overwrite in the ensuing race condition, the controller may erroneously conclude that the recycled (i.e., overwritten) data is the most recent data when in fact the most recent data is the host data in the new memory location based on the overwrite. Data loss can thus result following the system failure event.

Accordingly, in one aspect of the disclosure, a tag including a bit or set of bits is reserved in the data to be written. For example, in one embodiment, a tag is included with a packed sequence number structure in the data. The tag may identify the type of data written as a host write, a recycle write, or another write involving other internal data. Thus, when a race condition or other set of events produces one or more ambiguities as to the most recent data before a failure event, the controller can execute a restoration algorithm in which the tag is accessed at the relevant write locations to determine the type of data. The controller can, in turn, use the determined type of data together with the SNs to identify the most recent data (for example, host data from an earlier operation instead of recycled data or other internal data from a later operation).

In the restoration algorithm following a failure event, the controller can now use the tags to differentiate the type of data written in addition to the sequence of events based on the SNs. If the recycle operation occurs after the overwrite as described in the example above, the recycle operation may in some embodiments have an SN which is incremented relative to the overwrite operation. Based only on the value of the SNs, the controller may incorrectly conclude that the physical address of the recycle write is current as described above. However, with the tags, the controller may recognize that the write operation with the most recent SN is an internal recycle operation, whereas the immediately prior write is a host write. With this information, the controller may properly conclude that the most recent data is located at the new memory location, and that the recycled data can be discarded. The controller in this example may then assign the most recent LBA to the physical block address (PBA) associated with the identified host data.

In addition to the use of the tags for system restoration algorithms following failure, the tags can separately be used in another embodiment as part of a system integrity check to determine whether the storage device is functioning properly. Alternatively, the tags may be used in other applications of the storage device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks, or a page within a block. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
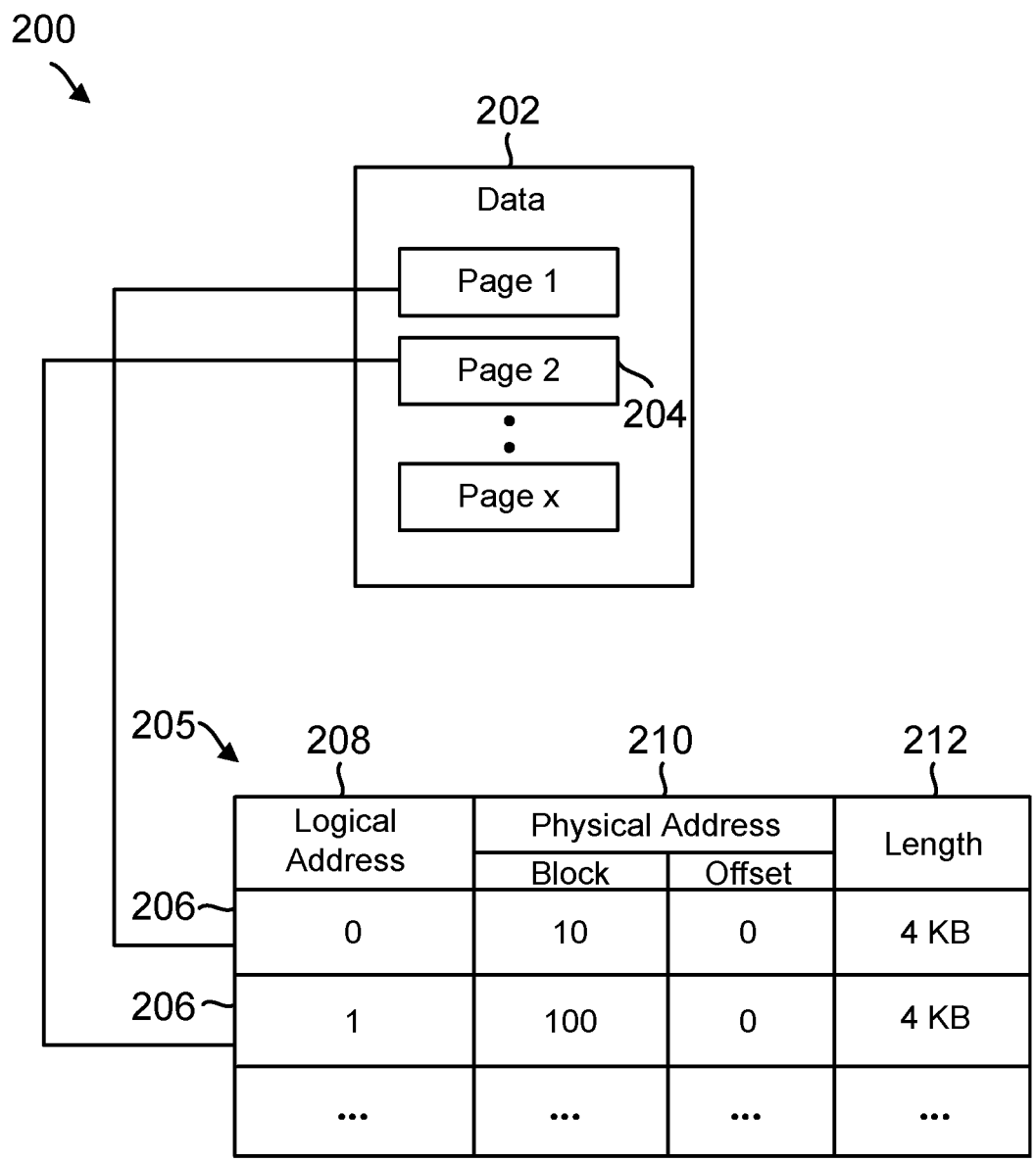
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
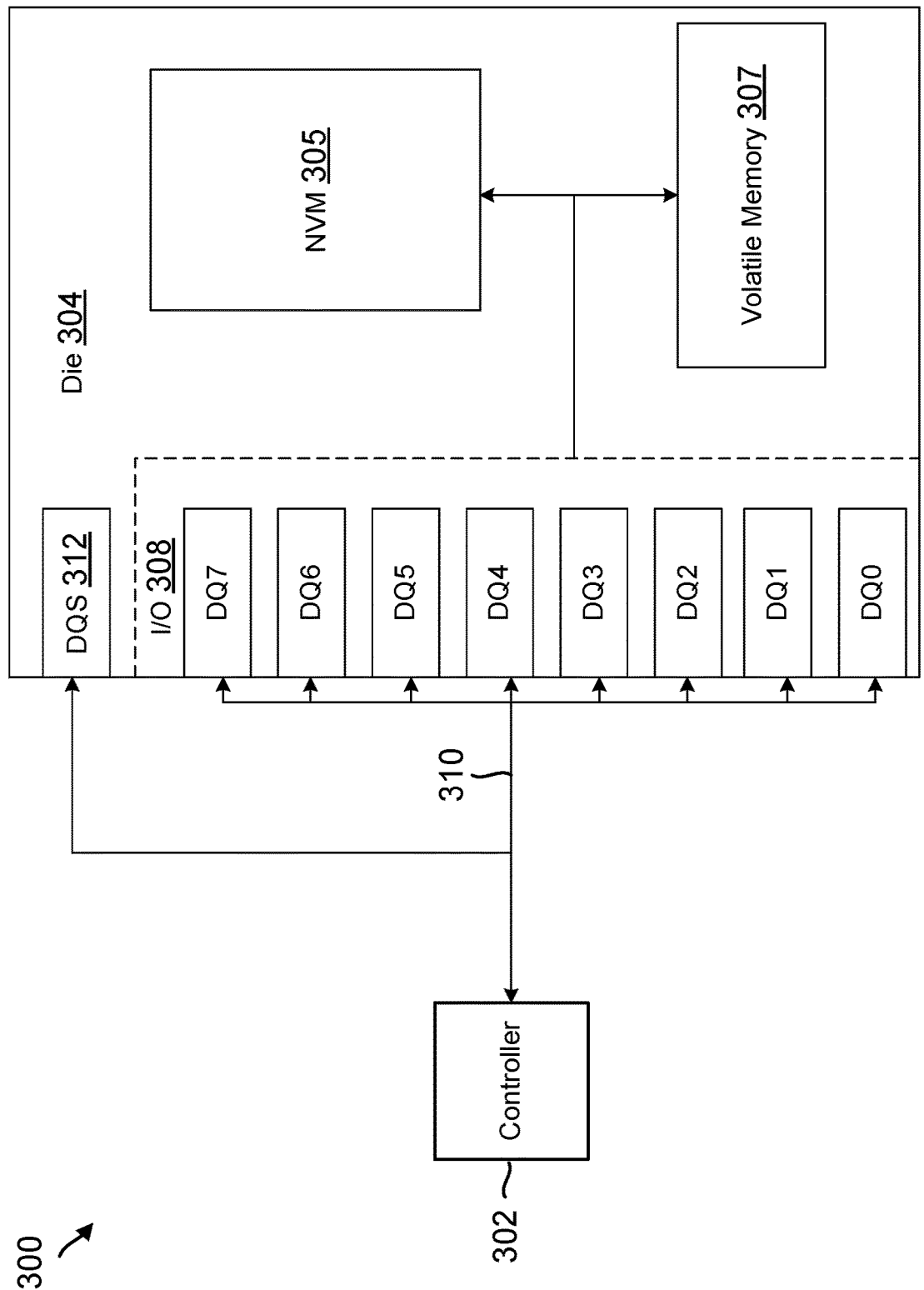
FIG. 3 is a block diagram illustrating a controller in communication with a die over a bus.

FIG. 3 illustrates an example diagram 300 illustrating a controller 302 in communication with a die 304 over a bus. Die 304 may include a NVM 305 that stores data (e.g. data 119 of FIG. 1), and a volatile memory 307. The controller 302 may correspond to controller 123 of FIG. 1, and the NVM 305 of die 304 may correspond to the memory location 112 of FIG. 1. Each die may include various pins which serve as interfaces between the controller and the die. For example, the die may include an input/output (I/O) 308 which is configured to receive inputs and transmit outputs (e.g. input data and commands from the controller to read, write, or erase data, and output data from the NVM 305 or volatile memory 307). I/O 308 may include a number of data lines or pins (DQ) that receive individual bits of input data and send individual bits of output data over a shared bus 310. In the example of FIG. 3, shared bus 310 may be an 8-bit bus which interfaces with eight DQ pins (DQ7:0), although a different bus width and number of DQs may be used (e.g. a 16-bit bus with 16 DQs). The die may also include a bidirectional data strobe signal (DQS) 312 that clocks the I/O 308 to receive and transmit data over the shared bus 310. For clarity, only I/O 308 and DQS 312 are illustrated in FIG. 3 for die 304; however die 304 may include other pins. For instance, the die may include a CE for receiving a chip-enable signal from the controller, a ready/busy (R/B) for outputting a ready or busy status to the controller, an address latch enable (ALE) for latching addresses into NAND, a command latch enable (CLE) for latching commands into a command register, a RE (read enable) for enabling output data buffers, and a WE (write enable) for clocking data, addresses, or commands into the NAND. Moreover, while FIG. 3 illustrates a single die in communication with the controller 302, multiple dies may communicate with the controller over the bus.

Figure 4:
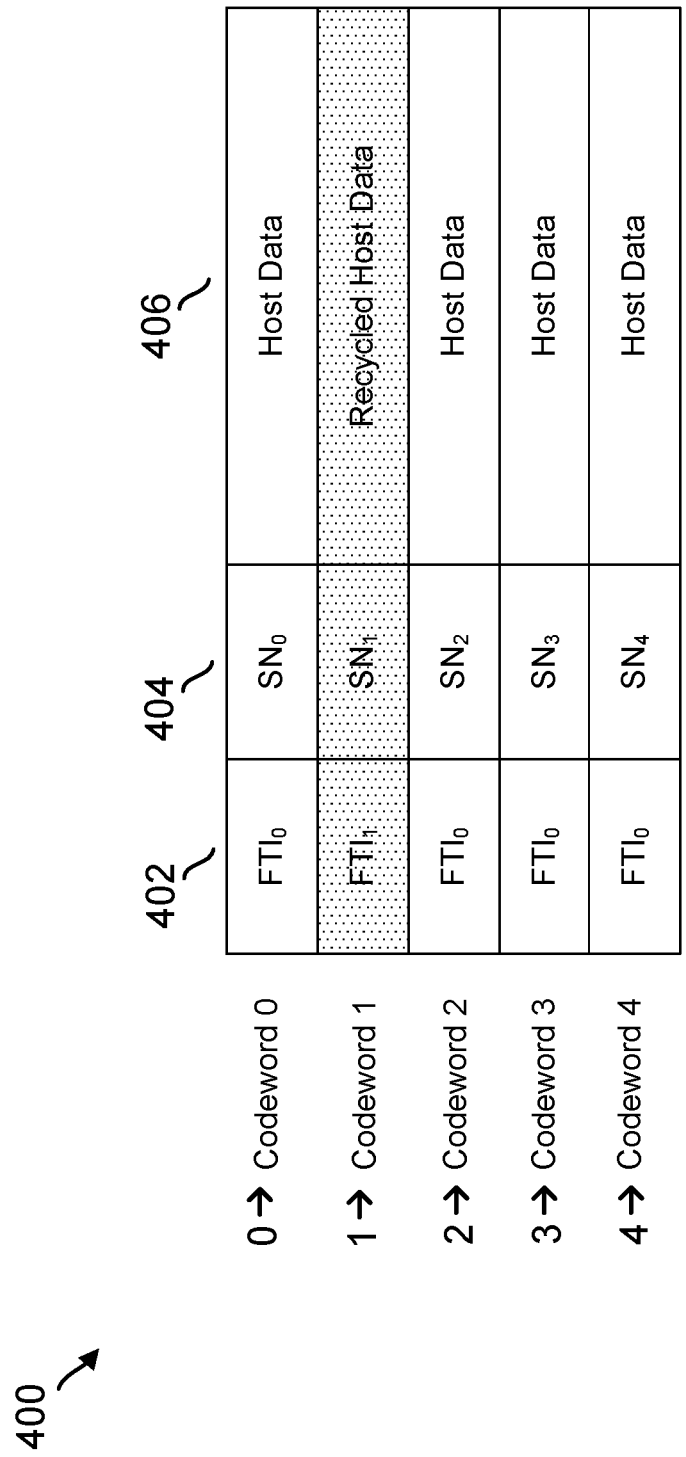
FIG. 4 is a table illustrating an example of a sequence of data codewords involved in successive write operations that incorporate sequence numbers.

FIG. 4 is a table 400 illustrating an example of a sequence of data codewords involved in successive write operations that incorporate SNs. The codewords may each correspond to write instructions, operations, or commands that the controller may execute to store respective data in memory. Column 402 identifies the forward table index (FTI) for the write operation. As described above, the FTI in this embodiment is an index associating the host LBA to the PBA of the memory location. The use of the FTI is exemplary, and the controller may use alternative techniques in other embodiments to keep track of the physical and logical addresses.

To keep track of the order of writes, column 404 identifies the SN stored in the data for that write operation. As noted above, due to GC and other operations, a codeword may include multiple SNs (e.g. the new SN as in column 404, and an old SN that may be previously appended to the data). The value of the SNs may differ in various embodiments, depending on the specific rules incorporated by the controller for incrementing SNs. In various embodiments, the SNs may be auto-incremented by the controller when writing data received from the host to memory. In other embodiments, the SNs may be incremented in NAND (e.g. by a processor or other circuitry on a die such as die 304) when the data is programmed in the memory. In some embodiments, internal writes may use SNs that are not incremented.

After a failure event where the data is decodable, the SNs can be retrieved and correlated with the most recently written data. Column 406 identifies the type of data in the write operation. In the example configuration of FIG. 4, it is assumed that the FTI and the SN are stored with the data. The data type information in column 406 may not be provided to the data, but rather is referenced in the Figure simply for illustrative purposes.

Referring initially to the entry for row 0, a host write operation indicated by codeword 0 may be performed at a memory location associated with $FTI_0$. The controller may assign an SN in a data field for the write operation. It assumed for this example that the assigned entry is $SN_0$. In the entry for row 1, a recycle write indicated by codeword 1 may occur at the memory location that corresponds to $FTI_1$. In this operation, the host data in codeword 1 may be copied from the memory location associated with $FTI_0$ and written to the new memory location that corresponds to $FTI_1$, typically in another block for NAND-based memory devices. The controller may update the L2P table to refer to the new memory location accordingly. Duplicate copies of the data, potentially including a different number of SNs, may thus be present in the memory as described above.

In the entry for row 2, an overwrite of the data in codeword 0, as indicated by codeword 2, may be initiated at the memory location corresponding to $FTI_0$. Thus the data in codeword 2 may be stored in a separate memory location and the physical address of the data may be updated to correspond with that separate memory location. The $SN_2$ for codeword 2 may, depending on the controller configuration, be auto-incremented, or it may be included in the data without being incremented.

Another overwrite of codeword 2, as indicated by codeword 3, may follow in the entry for row 3. Thus the data in codeword 3 may be stored in yet another memory location and the SN in the host data may be updated to $SN_3$. In the entry for row 4, the data in codeword 3 may be overwritten in similar manner, as indicated by codeword 4.

In the example of FIG. 4, the host data in row 1 is recycled with the SN intact from the host write at row 0. Thus, the SN alone may not be useful to determine the order of operations because it can be duplicated across different data entries in the system. Thus another indicator may be helpful to differentiate the writes.

Figure 5:
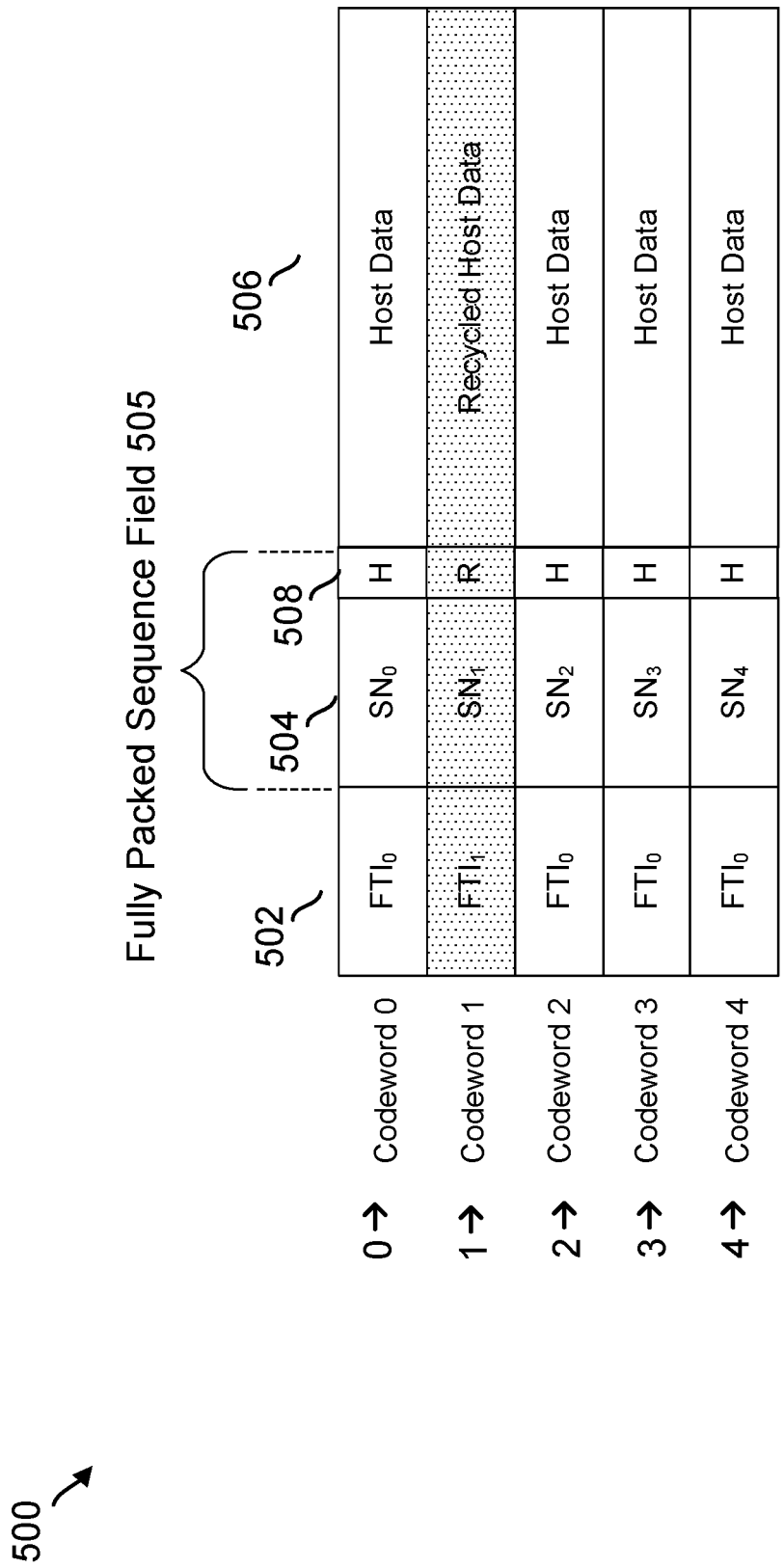
FIG. 5 is a table illustrating an example of sequentially written codewords that each include a tag in the fully packed sequence field indicating a data type.

FIG. 5 illustrates a table 500 of an example of sequential writes of successive codewords. Each codeword includes a tag 508 (e.g. a bit or set of bits) in a fully packed sequence field 505 indicating a data type of the data in the codeword. FIG. 5 depicts the same overall sequence of events as FIG. 4, with column 502 identifying the FTI, column 504 identifying the SN associated with the write operation, and column 506 identifying the data type. FIG. 5 further illustrates the fully packed sequence structure 505, which has a value that includes at least the SN 504 and the tag 508. While the example of FIG. 5 illustrates tag 508 as including a data type identifier of H (host data) or R (recycled host data), the tag may include other data type identifiers. For example, tag 508 may also include a data type identifier of O (other internal data). The value O may correspond to an error log, or other internal write operation not involving the host. Additionally, these identifiers are merely examples; other data type identifiers besides H, R, and O may be used for host data, recycled host data, and other internal data, respectively. Moreover, while the example of FIG. 5 illustrates the bits identifying the data type (the tag) as positioned after the SN, in other examples, the bits identifying the data type may be positioned elsewhere in the data.

Thus, in the sequence of write operations of FIG. 5, regardless of whether the same SN is found in multiple entries, the controller may identify details such as the tag 508 to efficiently restore the L2P table during a restoration algorithm following a system failure event. In addition to the SNs identifying the candidate data entries for the most recent operation, the controller can identify the corresponding data types using the tag. Thus, the controller may determine the most recent data by considering both the data type (e.g. in the tag) and the SN.

The use of the tags in connection with various embodiments can save significant CPU overhead time that would otherwise be incurred by the firmware for regenerating the correct order and identity of data entries. Further, as noted, during data recovery scans, the controller can readily identify internal data such as event logs, duplicate data entries and other non-essential data that the controller may not consider (e.g. discard) when performing system recovery. The controller can also subdivide and sort critical data above and beyond the examples described herein.

Another benefit is that the presence of the tag indicating the data type allows auto-incrementing of the SN during the recycle writes to become unnecessary, since the controller may use the tags to distinguish the events. Further, the system can be accorded the flexibility to tag the data either on the host writes or on the corresponding writes to the NAND. For example, if the controller inserts the tags during host writes, the controller can use that information in a restoration algorithm to determine why subsequent NAND writes were performed (e.g. whether as part of an overwrite, etc.). Conversely, if the tags are inserted in the die(s) during NAND writes, the controller can readily identify which event drove each write (e.g. whether an overwrite, recycle write, etc.), and thus both the data types and the most recent data can be seamlessly identified and recovered.

The use of tags identifying data type further obviates the problems faced by race conditions in multi-threaded environments. For instance, the controller can use the tag to determine whether or not a most recent write was a host write versus a recycle write. The controller can discard the data, for example, if the SN and tag indicate that the last operation was a recycle of data that had previously been designated to be overwritten. It will be understood that for NAND-based embodiments, erasing operations are performed at the block level, and that the data entries may instead be earmarked for discarding.

In some embodiments, the SN can be arranged in a predetermined order or position within the data such that when a system failure occurs, the controller can quickly determine the order in time in which the SNs were included with the data. This information can in turn be used in more detailed analyses, for example, to decrease the overall time to perform a full rebuild of the L2P table where necessary.

Figure 6A:
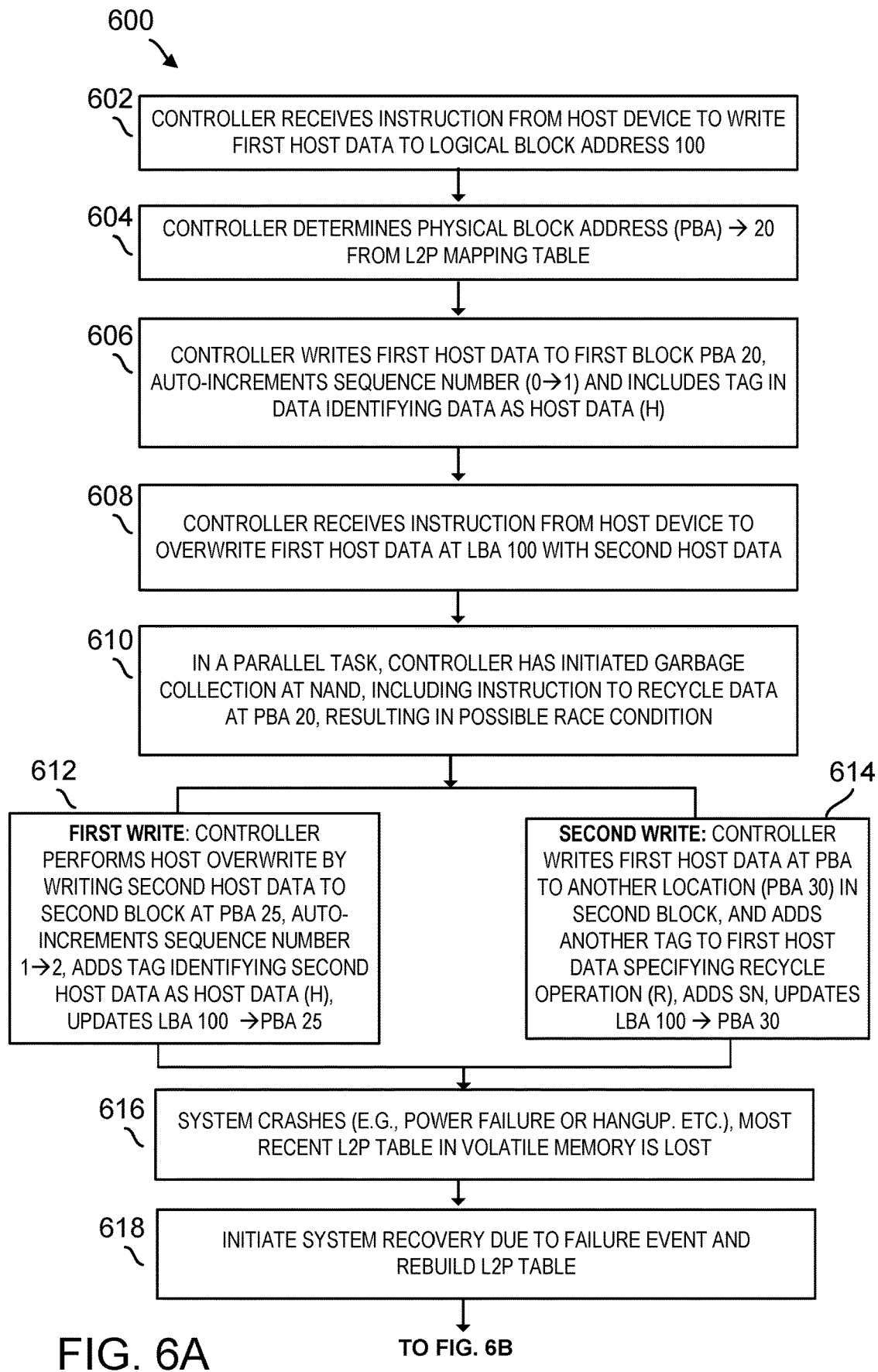
FIGS. 6A-B are a flow diagram illustrating an exemplary controller technique for writing data to memory with tags identifying the data type, and for retrieving the data and updating the logical-to-physical mapping table based on the sequence numbers and retrieved tags following a system failure event.
Figure 6B:
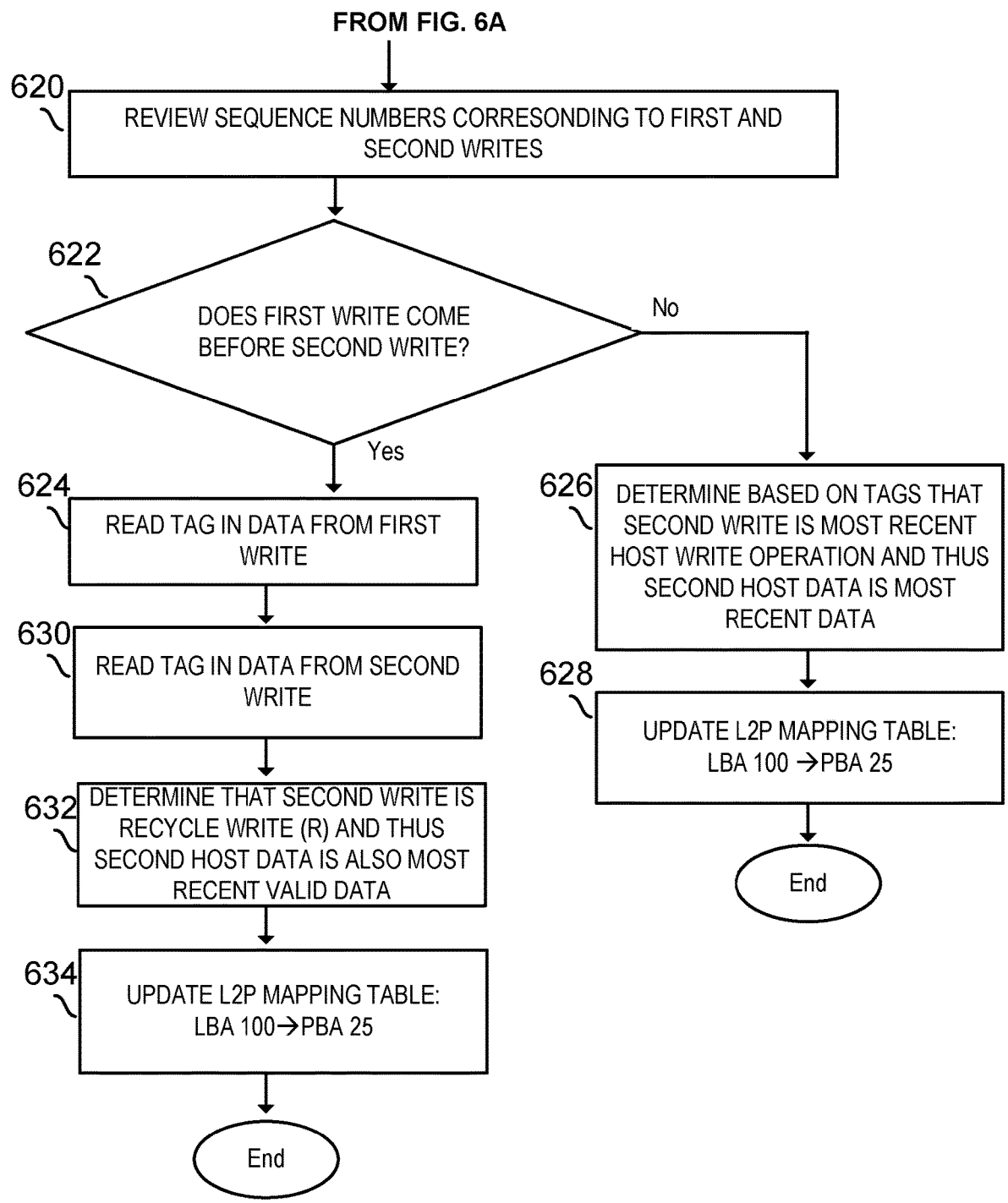

FIGS. 6A and 6B collectively represent a flow diagram 600 illustrating an example method for writing data to memory with tags identifying the data type, and for retrieving the data and updating a logical-to-physical mapping table based on sequence numbers and retrieved tags following a system failure event. For example, the method can be carried out in a storage device 102 such as the one illustrated in FIG. 1. Each of the steps in the flow chart can be controlled using the controller as described below (e.g. controller 123, 302), or by some other suitable means.

Here, it is assumed for simplicity that the logical addresses do not require an index and thus are the same as the logical block addresses (LBA). The address values and other details have also been simplified to avoid unduly obscuring the inventive concepts. While the following description refers to specific LBAs, PBAs, and other similar details in describing this example method, it should be noted that other LBAs, PBAs, or similar details may be used in other examples.

In one example, beginning at block 602 at FIG. 6A, the controller receives an instruction from the host device (or "host") to write first data to LBA 100. At block 604, the controller determines from the current L2P mapping table that a PBA corresponding to LBA 100=PBA 20. Thereupon, at block 606, the controller writes first host data to PBA 20 in accordance with the instruction from the host. The controller further auto-increments the sequence number from 0→1 and includes a tag in the data identifying the data as host data (H). At block 608, the controller then receives an instruction from the host to overwrite the first host data at LBA=100 with second host data. In a parallel task at block 610, the controller has also separately initiated a GC operation that includes an instruction to recycle data located at PBA=20. Accordingly, a race condition may be possible at this point.

At block 612, the controller performs a first write (e.g. an overwrite). In the first write, the controller executes the host overwrite by writing the second host data to a second block at PBA=25. The controller initiates this step by auto-incrementing the SN from 1→2, and by adding a tag along with the SN to the data identifying the data as host data (H). The controller updates LBA=100 to correspond with PBA=25. At approximately the same time, at block 614, the controller performs a second write (e.g. a recycle write). In the second write operation, the controller writes the first host data at another memory location (PBA=30) in the second block. Before the write, the controller adds to the data another tag specifying the data as a recycle operation (R). The controller may also add a non-incremented SN=2 to the data. The controller updates LBA=100 to correspond to PBA=30.

Immediately after the nearly contemporaneous events of blocks 612 and 614, at block 616, a system failure event occurs. The failure occurs after the data writes of blocks 612 and 614, but prior to the passing of updated address or other information, if any, from volatile to non-volatile memory. Thus the recent entries in the L2P table are lost.

Accordingly, at block 618, upon restoration of power (or rebooting the system after a software failure, for example), the controller initiates a system recovery algorithm to rebuild the L2P table, or in this simplified example, to identify the most recent data and corresponding PBA in memory for correctly updating the L2P table.

Continuing with this example and referring next to FIG. 6B, the controller retrieves various data entries, and reviews the SNs corresponding to the first and second writes (blocks 612 and 614). Based on the SN in the first write and the two SNs in the second write, the controller assesses in 622 whether the first write preceded the second write. If not, the controller in block 626 reviews the tags identifying the data type, and determines that the first write is the most recent write operation and therefore the second host data at PBA=25 is the updated data. The controller updates LBA 100→PBA 25 at in the L2P table (block 628). It should be understood that the specific order of reading the information in the data may vary. For example, the controller may read the SNs and the tags of the each data entry at or near the same time. Still other embodiments are possible.

Conversely, if at 622 it is determined that the first write came before the second write, the controller reads the tag in the data from the first write (block 624), and reads the tag in the data from the second write (block 630). Based on the tags and SNs, the controller determines that the second (most recent) write is a recycle write (R), and therefore that the second host data, rather than the recycled data, is similarly the updated data in this case (block 632). Consequently the controller similarly updates the L2P mapping table to LBA 100→PBA 25 (block 634).

It can be appreciated that in FIGS. 6A-B, if the controller only relied on the SNs to determine the most recent data without access to the tags, then in the case where the first write preceded the second write (as in blocks 624, 630, 632 and 634), the controller would have erroneously determined that the data from the second write (block 614), corresponding to the recycle operation (LBA→30), is the updated data (e.g. based on time or sequence number alone rather than also based on data type as described above), thereby causing the overwrite data to effectively be lost. However, the use of the tags enabled the controller to avoid this error.

It should be understood that FIGS. 6A-B represent a more simple example involving two data entries using the principles of this disclosure. However, the use of the tags can be relied on in much more complicated scenarios involving a large number of data entries, and based on far more sophisticated combinations of the SNs and the tags in these numerous entries. The tags add another useful resource to enable the system to potentially recover very quickly from otherwise cumbersome, resource-consuming efforts to properly repopulate the L2P table.

In another embodiment of the disclosure, the tags can be used as described herein in the context of a system integrity check to ensure that the memory systems are operating properly. In this optional implementation, the tags are used for overall memory assessment rather than being restricted to making modifications to the mapping table. The tags, more generally, provide another mechanism for assuring that the integrity of the data and address schemes are maintained, and the principles described herein can be combined with any number of existing solutions for recovering from failure events.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory; and
a controller coupled to the memory and configured to:
execute a first write operation with first host data and a second write operation with second host data using respective tags indicating a type of data for each of the first host data and the second host data, and
rebuild a logical-to-physical (L2P) mapping table using sequence numbering of the first write operation and the second write operation and by differentiating the type of data between the first host data and the second host data as either a host write or a recycle write for data recovery after a system failure event of the storage device.

2. The storage device of claim 1, wherein the memory comprises a NAND flash memory.

3. The storage device of claim 1, wherein the controller is further configured to tag the first host data in a first memory location of the memory identifying the type of data of the first host data as the host write, and to write the first host data to a second memory location of the memory with a second tag identifying the type of data of the first host data as the recycle write.

4. The storage device of claim 3, wherein the controller is further configured to assign a logical address to the second memory location.

5. The storage device of claim 4, wherein the controller is configured to write the first host data to the first memory location with a first sequence number (SN).

6. The storage device of claim 5, wherein the controller is further configured to write the first host data to the second memory location with the first SN in a garbage collection operation.

7. The storage device of claim 6, wherein the controller is further configured to overwrite the first host data, after writing the first host data to the first memory location and before writing the first host data to the second memory location, by writing further second host data to another memory location with a tag and a second SN, and to assign the logical address to the another memory location.

8. The storage device of claim 7, wherein the controller is configured to identify the second host data written to the another memory location as current data following the system failure event.

9. The storage device of claim 8, wherein the controller is configured to rebuild the L2P mapping table following the system failure event by mapping the logical address to the another memory location.

10. A storage device, comprising:
a memory comprising a first block having a first page and a second page; and
a controller coupled to the memory and configured to:
execute a first write operation to write first host data to the first page and a second write operation to write second host data to the second page using respective tags indicating a type of data for each of the first host data and the second host data, and
rebuild a logical-to-physical (L2P) mapping table using sequence numbering of the first write operation and the second write operation and by differentiating the type of data between the first host data and the second host data as either a host write or a recycle write for data recovery after a system failure event of the storage device.

11. The storage device of claim 10, wherein the memory further comprises a second block having a third page, wherein the controller is further configured to assign a logical address to the second block.

12. The storage device of claim 11, wherein the controller is configured to write the first host data to the first page with a first sequence number (SN), and to write the first host data to the third page with the first SN in a garbage collection operation.

13. The storage device of claim 12, wherein the controller is further configured to overwrite the first host data, after writing the first host data to the first page and before writing the first host data to the third page, by writing the second host data to the second page in the first block with a tag and a second SN, and to assign the logical address to the first block.

14. The storage device of claim 13, wherein the controller is configured to identify the second host data written to the second page as current data following the system failure event.

15. The storage device of claim 14, wherein the controller is configured to rebuild the L2P mapping table following the system failure event by mapping the logical address to the first block.

16. A storage device, comprising:
a memory having a first memory location and a second memory location; and
a controller coupled to the memory and configured to:
write a first codeword including first host data with a first tag to the first memory location, the first tag identifying a type of data of the first host data as a host write,
write a second codeword including second host data with a second tag to the second memory location, the second tag identifying the type of data of the second host data as a recycle write, and
rebuild a logical-to-physical (L2P) mapping table using sequence numbering of the first codeword and the second codeword and by differentiating the type of data between the first host data and the second host data as either the host write or the recycle write for data recovery after a system failure event of the storage device.

17. The storage device of claim 16, wherein the controller is further configured to assign a logical address to the second memory location.

18. The storage device of claim 17, wherein the controller is configured to write the first host data to the first memory location with a first sequence number (SN), and to write the second host data to the second memory location with a second SN.

19. The storage device of claim 18, wherein the controller is further configured to overwrite the first host data, after writing the first host data to the first memory location and before writing the first host data to a third memory location, by writing the second host data to the second memory location with a tag and a second SN, and to assign the logical address to the second memory location.

20. The storage device of claim 19, wherein the controller is configured to use the first tag, the second tag, the first SN and the second SN to identify the second host data written to the second memory location as current data following the system failure event.

* * * * *